United States Patent [19]

Soong

[11] 4,379,854
[45] Apr. 12, 1983

[54] LOW TEMPERATURE FIRING (1800°-2100° F.) OF BARIUM TITANATE WITH FLUX (LEAD TITANATE-BISMUTH TITANATE-ZINC OXIDE AND BORON OXIDE)

[75] Inventor: Jakob C. K. Soong, State College, Pa.

[73] Assignee: Erie Technological Products, Inc., Erie, Pa.

[21] Appl. No.: 232,143

[22] Filed: Feb. 6, 1981

[51] Int. Cl.³ .............................................. C04B 35/46
[52] U.S. Cl. ................................... 501/138; 361/321; 501/139
[58] Field of Search ...................... 106/73.31; 501/137, 501/138, 139; 361/321

[56] References Cited

U.S. PATENT DOCUMENTS

| 3,364,144 | 1/1968 | Pulvari | 501/137 |
| 3,473,958 | 10/1969 | Waku | 501/138 |
| 3,529,978 | 9/1970 | Taylor | 501/138 |
| 4,054,531 | 10/1977 | Takahashi et al. | 501/137 |
| 4,058,404 | 11/1977 | Fujiwara et al. | 501/137 |
| 4,120,677 | 10/1978 | Burn | 501/136 X |
| 4,283,753 | 8/1981 | Burn | 361/321 |

FOREIGN PATENT DOCUMENTS

| 5087049 | 1/1977 | Japan | 501/138 |
| 574577 | 1/1946 | United Kingdom | 501/137 |
| 692810 | 10/1979 | U.S.S.R. | 501/152 |

Primary Examiner—Helen M. McCarthy
Attorney, Agent, or Firm—Ralph Hammar

[57] ABSTRACT

A mixture of powders of barium titanate, a Curie point shifter and a lead titanate-bismuth titanate metal oxide flux which may be fired in a single step at 1800° F. to 2100° F. to produce a dense ceramic body with high dielectric constant. The ceramic is adapted to monolithic, multilayer ceramic capacitors. The low firing temperature minimizes the requirements of high temperature noble electrode material.

1 Claim, 1 Drawing Figure

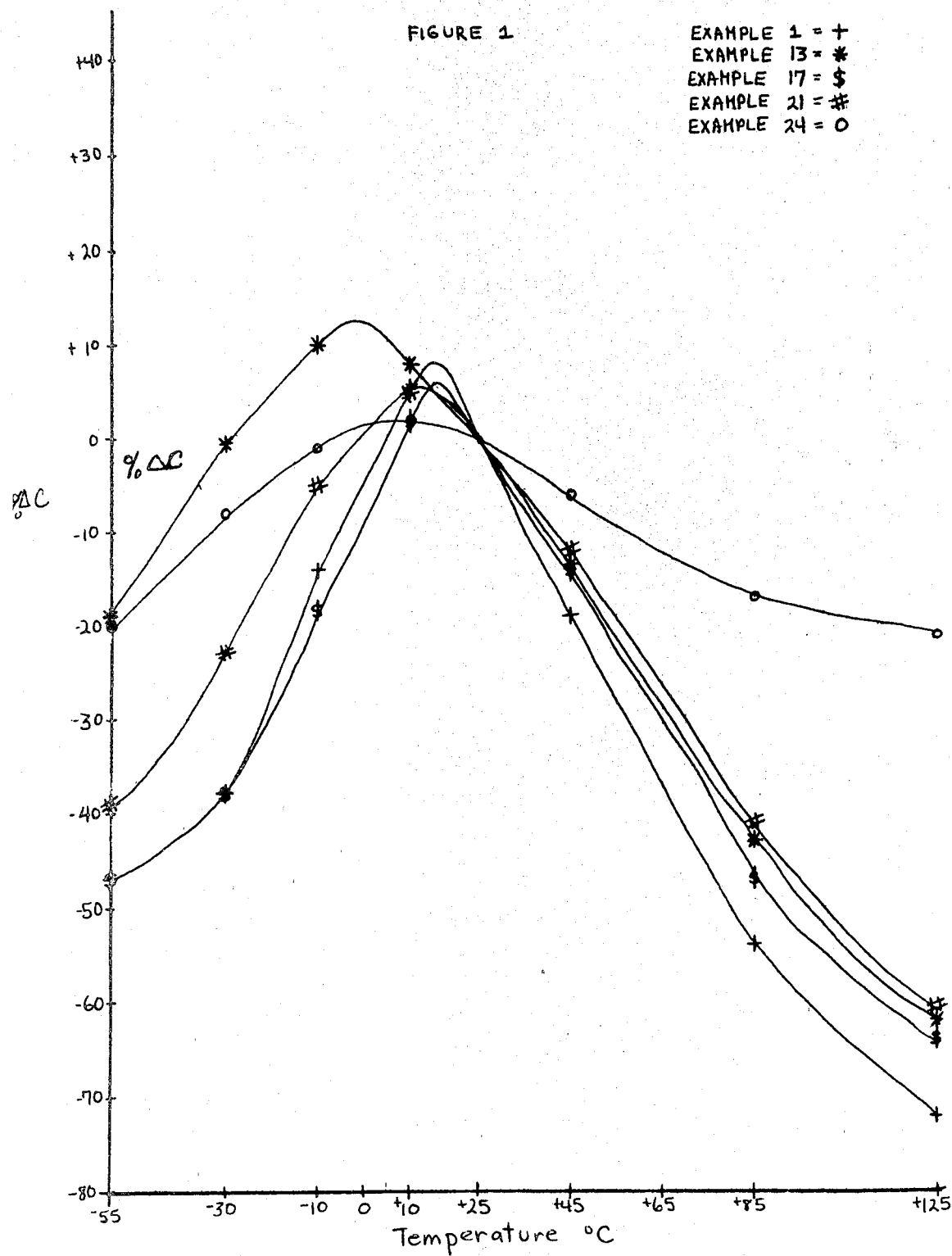

LOW TEMPERATURE FIRING (1800°-2100° F.) OF BARIUM TITANATE WITH FLUX (LEAD TITANATE-BISMUTH TITANATE-ZINC OXIDE AND BORON OXIDE)

This invention is a low firing ceramic dielectric of barium titanate, a zirconate or stannate Curie point shifter, and a titanate and oxide flux. The flux forms a liquid phase during the initial stage of the firing cycle and enhances the formation of solid solution and grain growth of the ceramic dielectrics and lowers the maturing sintering temperature.

BACKGROUND OF THE INVENTION

In the formation of low firing ceramic dielectric for capacitor application, prefiring of the ceramics is traditionally required. For example, to form a single phase ceramic such as an alkaline-earth titanate-zirconate solid solution, the mix is precalcined at elevated temperature, for example, above 2200° F. and is then pulverized and mixed with a glass phase and sintered at a temperature of less than 2100° F.

Recently a glass reacted-ceramic dielectric has been formed from at least two distinctly different ceramic materials prior to mixing and firing to the maturity of the ceramic dielectric.

An object of this invention is to form ceramic dielectrics by direct mixing of all required ceramic compounds and sintering the same to maturity at a temperature less than 2100° F. without precalcining the ceramic materials such as barium titanate and Curie point shifter or prefiring a glass material.

A further object is to provide an economic method for making a low temperature sintered ceramic dielectric material with exceptional high dielectric constant to be used for ceramic disc and multilayer capacitors and for other applications.

The process starts with the mixing of finely ground powder of commercial barium titanate plus a Curie point shifter such as $SrZrO_3$, $BaZrO_3$, $CaZrO_3$, $CaSnO_3$, and $ZrO_2$ with a titanate flux such as $PbTiO_3$, $Bi_2Ti_2O_7$, and a oxide flux such as $ZnO$, and $B_2O_3$ in a polymeric suspension media and milled in a ceramic ball mill to desirable particle size and distribution. The resulting ceramic slurry is cast into a film form known as ceramic tape.

Metal electrodes are deposited in paste form on the green ceramic tape. The paste consists of metal powder dispersed in a plasticized polymeric binder system with a solvent to form a screenable paste. The paste may contain 40% to 80% metal powder by weight.

The dried tape is cut and stacked in a way such that the individual capacitors are in parallel. The stack is then pressed to desirable green density to form monolithic capacitors.

The organics in the monolithics are then slowly burned off and the ceramics are sintered at an appropriate temperature to form a dense ceramic body. Metal termination materials are fired on both sides of the ceramic capacitor to form monolithic capacitors.

This invention resides in the discovery that the sintering temperature of the monolithic capacitors can be carried out below 2100° F. with the addition of the flux. The low sintering temperature allows the use of more economic palladium and silver electrode paste systems.

In the drawing, the single figure shows curves of the percent change of dielectric constant plotted against temperature.

EXAMPLE 1

A 2.5 kg ceramic slurry was prepared that consists of 91.6% by weight of barium titanate*, 8.4% by weight of $SrZrO_3$ and flux level of 10% by weight of the above compounds with composition of 38.0 wt% $PbTiO_3$, 25.3 wt% $Bi_2Ti_2O_7$, 24.1 wt% $ZnO$, and 12.6 wt% $H_3BO_3$. For convenience of the process, $H_3BO_3$ is used instead of $B_2O_3$. The flux essentially has the composition of $3PbTiO_3 \cdot Bi_2Ti_2O_7$ and $3ZnO \cdot B_2O_3$+ at the weight ratio of 63.3 titanates to 36.7 oxides. $MnCO_3$ in the amount of 0.1 wt% of all above solids is added to improve the insulation resistance (IR).

*Commercial grade, contents 0.25 wt% of $Nb_2O_5$ and 0.6 wt% SrO as major impurities.
+Calculation including the impurities of raw materials.

Ceramic tape with green thickness of 1.5 mils was screened with electrode ink consisting of 30% by weight of palladium and 70% by weight of silver with appropriate amount of polymeric binder, plasticizer and solvent and processed by the method mentioned above.

Individual multilayer capacitors consisting of a chip of 23 metal electrode layers separated by 1.5 mil green ceramic tape with cover layers on top and bottom of the chip were sintered at 2050° F. for three hours on zirconia plates both in open and in confinement of $Al_2O_3$ sagger with air atmosphere. Conventional silver termination was applied and fired on chip to pick up the internal electrode of the chips. The electrical properties obtained from these chips made by this ceramic body, as herein called as dielectrics, are listed in Table I.

TABLE I

| | Dielectric Constant | % DF @1VRMS per mil | *IR at 25° C. Ω-F | IR at 85° C. Ω-F | IR at 125° C. Ω-F | Curie Point °C. |
|---|---|---|---|---|---|---|
| Example 1 | 6300 | <1.7 | >12,000 | >1,500 | >150 | 15 |

*IR = insulation resistance
DF = dissipation factor
Ω-F = ohm farads

It is quite apparent that the addition of flux materials enhances the solid solution formation of barium titanate and alkaline earth zirconate at the relatively low sinter temperature of 2050° F. This is indicated as a single dominant peak in FIG. 1 where the percent change of dielectric constant K was plotted with respect to the temperature. This peak is also referred to as Curie point of the dielectric, in this case, is located around 15° C.

This dielectric meets the Z5U TCC characteristics and passes the 2000 hour life test at the condition of 150 volts DC and 85° C. with no insulation resistance (IR) degradations.

EXAMPLES 2-7

The same method to make the dielectric of Example 1 described above was used to prepare Examples 2-7.

The composition in Examples 2 to 7 have had the same amount of flux and $MnCO_3$ used in Example 1, but with $BaTiO_3$ to $SrZrO_3$ weight ratio varied from 95 to 5 to 88 to 12.

The parts were again sintered at 2050° F. for three hours on zirconia plate in open air and in confined air atmopshere of $Al_2O_3$ sagger. Table II represents the results.

TABLE II

| Example | Weight Ratio $BaTiO_3$/$SrZrO_3$ | Dielectric Constant | % DF @1.0VRMS/ mil | IR at 25° C. Ω-F | IR at 85° C. Ω-F | IR at 125° C. Ω-F | Curie Point °C. |
|---|---|---|---|---|---|---|---|
| 2 | 95.0/5.0 | 4800 | <6.0 | >6000 | >1200 | >150 | +50 |
| 3 | 92.6/7.4 | 5700 | <4.4 | >12000 | >1200 | >150 | +35 |
| 4 | 92.0/8.0 | 5900 | <3.1 | >12000 | >1200 | >150 | +28 |
| 5 | 91.2/8.8 | 5400 | <1.0 | >10000 | >1000 | >130 | −5 |
| 6 | 90.0/10.0 | 3900 | <0.6 | >5000 | >1000 | >120 | −20 |
| 7 | 88.0/12.0 | 2950 | <0.4 | >3000 | >800 | >90 | −35 |

The $SrZrO_3$ content in the $BaTiO_3$ and flux solids solution effectively adjust the Curie point in the temperature spectrum to provide a series of useful dielectrics dependent upon the application.

EXAMPLES 8–10

The same method and composition of both ceramics and flux used to make the dielectric of Example 1 was used to prepare samples with variations of flux to ceramic weight ratio from 5.0/100.0 to 15.0/100.0. Again 0.1 wt% of $MnCO_3$ of amount of ceramic solids was added for IR improvement.

The amount of flux in the dielectrics affects the sintering properties and dielectric performances. Table III lists the results of samples sintered at various temperatures with the same equipment and method used to sinter the dielectric of Example 1.

TABLE III

| Example | Flux/Ceramic weight ratio | Firing temperature °F. | Dielectric Constant | % DF @1.0VRMS mil | IR at 25° C. Ω-F | IR at 85° C. Ω-F | IR at 125° C. Ω-F | Curie Point °C. |
|---|---|---|---|---|---|---|---|---|
| 8 | 5.0/100.0 | 2050 | 2000 | <6.1% | <1000 | — | — | 10 |
|   |           | 2100 | 2400 | <4.3% | <1000 | — | — | 10 |
| 9 | 12.0/100.0 | 2050 | 5900 | <1.3% | >1000 | >1500 | >1500 | 0 |
| 10 | 15.0/100.0 | 2050 | 4500 | <1.0 | >8000 | >1000 | >1000 | −10 |
|    |            | 2000 | 3700 | <2.2 | >5000 | — | — | −13 |
|    |            | 1800 | 2900 | <2.9 | >1500 | — | — | −16 |

Insufficient and excess flux have detrimental effects on the dielectric performances of the dielectrics.

EXAMPLES 11–24

Zirconia oxide and alkaline earth zirconates and alkaline earth stannate were used as Curie point shifters in the application of this invention with the composition listed in Table IV. The same flux as in Example 1 with the same composition was used to form dielectrics in this section. 0.1 wt% of $MnCO_3$ of total amount of ceramic solid is also added in all dielectric compositions in Table IV.

TABLE IV

| Example | Curie Point Shifter | Weight Ratio of Curie Point Shifter to $BaTiO_3$ | Weight Ratio of flux to ceramics ($BaTiO_3$ plus curie point shifter) |
|---|---|---|---|
| 11 | $BaZrO_3$ | 8.0/92.0 | 10.0/100.0 |
| 12 | $BaZrO_3$ | 10.0/90.0 | 10.0/100.0 |
| 13 | $BaZrO_3$ | 11.4/88.6 | 10.0/100.0 |
| 14 | $BaZrO_3$ | 13.5/86.5 | 10.0/100.0 |
| 15 | $BaZrO_3$ | 15.0/85.0 | 10.0/100.0 |
| 16 | $CaSnO_3$ | 6.5/93.5 | 10.0/100.0 |
| 17 | $CaSnO_3$ | 9.15/90.85 | 10.0/100.0 |
| 18 | $CaSnO_3$ | 11.0/89.0 | 10.0/100.0 |
| 19 | $CaSnO_3$ | 13.0/97.0 | 10.0/100.0 |
| 20 | $CaZrO_3$ | 7.0/93.0 | 10.0/100.0 |
| 21 | $CaZrO_3$ | 8.0/92.0 | 10.0/100.0 |
| 22 | $CaZrO_3$ | 9.5/90.5 | 10.0/100.0 |
| 23 | $CaZrO_3$ | 10.5/89.5 | 10.0/100.0 |
| 24 | $ZrO_2$ | 4.8/95.2 | 10.0/100.0 |

The dielectric properties of multilayer ceramic capacitors made and processed with the same procedures as Example 1 are presented in Table V.

TABLE V

| Example | Dielectric Constant | % DF @1VRMS per mil | IR at 25° C. Ω-F | IR at 85° C. Ω-F | IR at 125° C. Ω-F | Curie Point °C. |
|---|---|---|---|---|---|---|
| 11 | 3900 | <5.2 | >6000 | — | — | 62 |
| 12 | 5100 | <2.5 | >20000 | >1500 | >150 | 40 |
| 13 | 5300 | <1.3 | >10000 | >1200 | >100 | 0 |
| 14 | 4800 | <1.1 | >10000 | >1100 | >100 | −24 |
| 15 | 3400 | <0.8 | >5000 | — | — | −37 |
| 16 | 2000 | <4.5 | >4000 | >800 | >150 | 55 |
| 17 | 5000 | <1.7 | >10000 | >1500 | >120 | 15 |
| 18 | 4500 | <0.8 | >10000 | >1000 | >100 | −15 |
| 19 | 2900 | <0.5 | >5000 | >800 | >100 | −32 |
| 20 | 4100 | <4.0 | >7000 | >1000 | >100 | 43 |
| 21 | 5100 | <1.5 | >6000 | >1000 | >120 | 10 |
| 22 | 3500 | <1.0 | >10000 | >800 | >100 | −24 |
| 23 | 3100 | <0.6 | >4000 | >700 | >100 | −31 |
| 24 | 2000 | <3.3 | >1800 | — | — | 5 |

All Curie point shifters when mixed with barium titanate and flux in these dielectrics form a single peak solid solution after being properly sintered. The dielectric constant K of examples in this section are not as high as those with $SrZrO_3$ in previous examples. This is indicated in the less pronounced peaks plotted in FIG. 1.

The using of zirconia as Curie point shifter provides a much flatter temperature coefficient of capacitance curve and low dielectric constant. The composition in example 24 is not suitable to be used in making capacitors with Z5U characteristics, however, it could be used for other applications.

EXAMPLES 25-27

The effects of flux compositions in relating to the sintering and dielectric properties of this invention are studied in Examples 25, 26 and 27. The composition is summarized in Table VI.

TABLE VI

| Example | Curie Point Shifter | Weight ratio Curie Point Shifter to BaTiO$_3$ | Composition of the flux | | Weight ratio of flux to ceramics (BaTiO$_3$ plus curie point shifter) |
|---|---|---|---|---|---|
| 25 | SrZrO$_3$ | 8.4/91.6 | PbTiO$_3$ | 40.0 wt % | 10.0/100.0 |
|  |  |  | Bi$_2$O$_3$ | 19.9 wt % |  |
|  |  |  | TiO$_2$ | 3.4 wt % |  |
|  |  |  | ZnO | 24.0 wt % |  |
|  |  |  | H$_3$BO$_3$ | 12.7 wt % |  |
| 26 | SrZrO$_3$ | 5.0/95.0 | PbTiO$_3$ | 63.3 wt % | 10.0/100.0 |
|  |  |  | ZnO | 24.1 wt % |  |
|  |  |  | H$_3$BO$_3$ | 12.6 wt % |  |
| 27 | SrZrO$_3$ | 15.0/85.0 | Bi$_2$Ti$_2$O$_7$ | 63.3 wt % | 10.0/100.0 |
|  |  |  | ZnO | 24.1 wt % |  |
|  |  |  | H$_3$BO$_3$ | 12.6 wt % |  |
| 1 | SrZrO$_3$ | 8.4/91.6 | PbTiO$_3$ | 38.0 wt % | 10.0/100.0 |
|  |  |  | Bi$_2$Ti$_2$O$_7$ | 25.3 wt % |  |
|  |  |  | ZnO | 24.1 wt % |  |
|  |  |  | H$_3$BO$_3$ | 12.6 wt % |  |

The titanate compounds used in the flux of Example 25 have the composition of 3PbTiO$_3$.2Bi$_2$O$_3$.3TiO$_2$ and retain the titanate flux to 3ZnO.B$_2$O$_3$ weight ratio at 63.3 to 36.7. In Examples 26 and 27, the Bi$_2$Ti$_2$O$_7$ and PbTiO$_3$ were deleted respectively. The composition of Example 1 is tabulated here again for comparison.

Multilayer capacitors were made and processed and sintered with method mentioned in Example 1. The results are summarized in Table VII.

TABLE VII

| Example | Dielectric Constant | % DF @1VRMS per mil | IR at 25° C. Ω-F | IR at 85° C. Ω-F | IR at 125° C. Ω-F | Curie Point °C. |
|---|---|---|---|---|---|---|
| 25 | 6450 | <1.6 | >12,000 | >1,500 | >150 | 17 |
| 26 | 2900 | <0.5 | >3,500 | >600 | >70 | −30 |
| 27 | Very poor sintering | | | | | |
| 1 | 6300 | <1.7 | >12,000 | >15,000 | >150 | 15 |

The use of the ferroelectric bismuth titanate phase of 2Bi$_2$O$_3$.3TiO$_2$ instead of Bi$_2$Ti$_2$O$_7$ in Example 25 did not show significant improvement in dielectric constant and other dielectric properties as compared to Example 1.

In Examples 26 and 27, the importance of PbTiO$_3$ and Bi$_2$Ti$_2$O$_7$ in developing this invention are demonstrated.

EXAMPLES 28-30

The effectiveness of the compounds zinc oxide and boron oxide in the flux and its role in the sintering of the invented dielectrics are established in Examples 28-30 with the composition listed in Table VIII plus 0.1 wt% of MnCO$_3$ of total amount of ceramic solids in each dielectric.

TABLE VIII

| Example | Curie Point Shifter | Weight Ratio of curie point shifter to BaTiO$_3$ | Composition of the flux | | Weight ratio of flux to ceramics (BaTiO$_3$ plus curie point shifter) |
|---|---|---|---|---|---|
| 28 | SrZrO$_3$ | 8.4/91.6 | PbTiO$_3$ | 43.5 wt % | 10.0/100.0 |
|  |  |  | Bi$_2$Ti$_2$O$_7$ | 29.0 wt % |  |
|  |  |  | ZnO | 27.5 wt % |  |
| 29 | SrZrO$_3$ | 7.8/92.2 | PbTiO$_3$ | 43.5 wt % | 12.0/100.0 |
|  |  |  | Bi$_2$Ti$_2$O$_7$ | 29.0 wt % |  |
|  |  |  | ZnO | 27.5 wt % |  |
| 30 | SrZrO$_3$ | 8.4/91.6 | PbTiO$_3$ | 60.0 wt % | 10.0/100.0 |
|  |  |  | Bi$_2$Ti$_2$O$_7$ | 40.0 wt % |  |

The capacitors were made with these dielectrics with the same method and processed and sintered as in Example 1.

The dielectric properties of these examples are summarized in Table IX.

TABLE IX

| Example | Sintering Temperature °F. | Dielectric Constant | % DF @1VRMS per mil | IR at 25° C. Ω-F | IR at 85° C. Ω-F | IR at 125° C. Ω-F | Curie Point °C. |
|---|---|---|---|---|---|---|---|
| 28 | 2100 | 5600 | 1.8 | 16,000 | 1,400 | 120 | 0 |
| 29 | 2100 | 5400 | 1.3 | 14,000 | 1,000 | 100 | 5 |
|  | 2080 | 5100 | 1.7 | 10,000 | 800 | 70 | 5 |
| 30 | 2100 | No appreciable grain growth, very poor sintering | | | | | |

The elimination of boron oxide in the flux surprisingly provides a dense useful dielectric in Example 28 albeit with lower dielectric constant K and had to be sintered to maturity at 2100° F. Increasing the weight ratio of flux to titanate plus zirconate to 12.0/100.0 in Example 29 did not improve the dielectric performance, however the additional flux did allow the dielectric to be sintered to a dense ceramic body around 2080° F.

There is no appreciable grain growth and very poor sintering in dielectrics without both zinc oxide and boron oxide in Example 30.

I claim:

1. A method for making a dense ceramic dielectric body possessing very high dielectric constant at 25° C. which consists essentially of firing at between 1800° and 2100° F. a body of mixed powders of ceramic and flux, said ceramic powders consisting essentially of powders of barium titanate and powders of SrZrO$_3$ as cubic point shifter, and said flux powders consisting essentially of 10 parts by weight/100 of the aforesaid ceramic powders and said flux powders consisting essentially of powders of lead titanate, powders of bismuth titanate, powders of metal oxide flux selected from the group consisting of powders of ZnO and powders of B$_2$O$_3$, the weight of the bismuth titanate and lead titanate powders being substantially twice the weight of the powders of ZnO and B$_2$O$_3$, and ZnO being 24 to 40% and B$_2$O$_3$ 0 to 12% by weight of the flux.

* * * * *